United States Patent [19]

Kilgour et al.

[11] Patent Number: 4,690,955
[45] Date of Patent: Sep. 1, 1987

[54] POLYETHER SILICONE COPOLYMERS WITH MIXED HYDROXY ALKOXY CAPPING FOR STABILIZING HIGH SOLID CONTENT, MOLDED, FLEXIBLE URETHANE FOAM

[75] Inventors: John A. Kilgour, Putnam Valley, N.Y.; Michael W. Jorgenson, Charleston, W. Va.

[73] Assignee: Union Carbide Corporation, Danbury, Conn.

[21] Appl. No.: 880,295

[22] Filed: Jun. 30, 1986

[51] Int. Cl.$^4$ .............................................. C08G 18/14
[52] U.S. Cl. ................................... 521/112; 521/174; 556/465
[58] Field of Search ................. 521/112, 174; 556/465

[56] References Cited

U.S. PATENT DOCUMENTS 3,741,917  6/1973  Morehouse ..................... 521/112
4,031,044  6/1977  Joslyn ............................ 521/112
4,478,957 10/1984  Klietsch et al. ............... 521/112

Primary Examiner—Maurice J. Welsh
Attorney, Agent, or Firm—P. W. Leuzzi

[57] ABSTRACT

This invention describes novel molded flexible polyurethane foam surfactants which can be used in foam having high concentrations of reinforcing graft copolymer solids. The invention also describes the improved process for making these foams using the novel surfactants.

24 Claims, No Drawings

POLYETHER SILICONE COPOLYMERS WITH MIXED HYDROXY ALKOXY CAPPING FOR STABILIZING HIGH SOLID CONTENT, MOLDED, FLEXIBLE URETHANE FOAM

BACKGROUND OF THE INVENTION

1. Field of the Invention

This invention relates to polyurethane foam surfactants. More specifically, this invention relates to novel surfactants made from polydialkylsiloxane-polyoxyalkylene copolymers which have both hydrocarbon and hydroxy capped polyoxylalkylene pendants on the same copolymer. These surfactants have particular advantage in manufacturing flexible polyurethane foam with higher than normal amounts of solid polymer.

2. Prior Art

Molded, flexible polyurethane foams are produced by the reaction of high molecular weight polyols, which polyols have greater than 40% of primary hydroxyl capping, with organic isocyanates and water. Molded, flexible polyurethane foams are distinguishable, in part, from conventional hot cure polyurethane foams by the use of such a high percentage of primary hydroxyl groups as well as by the fact that molded flexible polyurethane foams require little or no oven curing and thus are often referred to as cold cure foams. Such foams are extremely desirable for cushioning applications because of their excellent physical properties, e.g., very high foam resiliency, open celled structure, low flex fatique, i.e., long life, and high SAC factors, i.e., load bearing properties.

Because of the high reactivity of molded, flexible foam ingredients and their rapid buildup of gel strength, sometimes the foam can be obtained without a cell stabilizer. However, such foams typically have very irregular, coarse cell structure as particularly evidenced by surface voids. A variety of attempts have been made to solve this problem through the use of stabilizers consisting of substituted polydimethyl- or polyphenylmethylsiloxanes.

One group of stabilizers, described in U.S. Pat. Nos. 3,741,917 to Morehouse et al and 4,031,044 to Joslyn et al., is based on polydimethylsiloxane-polyoxyalkylene copolymers. The polyoxyalkylene pendant groups on the stabilizers in these patents, however, are always hydrocarbon capped.

Other polysiloxanes bearing pendant groups have also been claimed as stabilizers for molded flexible urethane foam. In general they are copolymers consisting of a polydimethylsiloxane to which are attached organic pendant groups that include: methyl groups (U.S. Pat. No. 2,901,445); cyanoalkyl groups (U.S. Pat. No. 3,905,924); phenylethyl groups (U.S. Pat. No. 3,839,384); alkyl groups (U.S. Pat. No. 4,306,035); trimethylsiloxy groups (U.S. Pat. No. 3,844,847); sulfolanyloxyalkyl groups (U.S. Pat. No. 4,110,272); morpholinoalkoxyalkyl groups (U.S. Pat. No. 4,067,828), and the tertiary hydroxyalkyl group (U.S. Pat. No. 4,039,490). None of these patents suggest hydroxy terminated polyoxyalkylene pendant groups attached to the siloxane chain let alone a copolymer with a mixture of both hydroxy and hydrocarbon terminated pendants on the same copolymer.

Recent U.S. Pat. No. 4,478,957 to Klietsch et al does describe polysiloxane-polyoxyalkylene copolymers wherein the polyoxyalkylene portions of the copolymer are either totally hydroxy terminated or totally alkyl, carboxy, or alkylaryl capped. Again, however, this patent does not contemplate using a single copolymer which has both hydroxy terminated and hydrocarbon terminated polyoxyalkylene pendants attached to it. Nor does the patent contemplate the use of hydroxy capped pendants when the copolymer might be used in a blend with another copolymer.

Moreover, all of the above mentioned stabilizers have been designed for molded flexible polyurethane foam containing low levels of reinforcing grafted copolymer rather than those containing high concentrations of these solids. This distinction is important for reasons discussed below.

Reinforcing grafted copolymer polyols are typically prepared by polymerizing one or more ethylenically unsaturated monomers, for example styrene and acrylonitrile, in a polyether polyol, or by reacting a diisocyanates with polyamines or hydrazines in a polyether polyol. Typically, the reinforcing grafted copolymer polyols for current molded polyurethane formulations contain about 20 percent solids in the polyol. This is normally formulated as about 50 percent of the final grafted copolymer content, thus bringing the actual solids content to about 10 percent.

Recently, however, it has become desirable to manufacture molded, flexible foam with increased firmness. Increased firmness is desirable so that thinner or lower density foam sections can be manufactured with load bearing properties equal to sections currently being made, or for the manufacture of sections with greater firmness where higher load bearing foam is desired. Such improved foams are especially desirable in the automotive seat market where reduced size and weight are important considerations in the design of smaller automobiles. One important method of achieving greater foam firmness is to increase the concentration of solids used in the urethane formulation.

Most recently, blends of conventional flexible polyurethane foam surfactants and high resiliency polyurethane foam surfactants (U.S. Pat. Nos. 4,309,508 and 4,477,601) have been taught as a method of increasing the concentration of these solids in the total polyol mixture. The small amounts of a conventional surfactant required presents considerable difficulties as minor errors in preparing these stabilizers can have significant, adverse effects on the performance characteristics of foam stability or foam breathability. Also, as in those systems for stabilizing low levels of reinforcing grafted copolymer solids, hydroxy groups are not present as the capping group in the pendant chain of these copolymers.

Of further concern in selecting a stabilizer is the breathability or open celled character of foam. Greater breathability, i.e., more open celled character, of the foam is desirable because it provides a greater processing latitude. A narrow processing latitude forces the foamer to adhere to very close tolerances in metering out the foaming ingredients which can not always be accomplished. Further, greater breathability provides foam that is considerably more easy to crush, thus avoiding splits that might occur during crushing. This characteristic is particularly desirable in foamed parts that incorporate wire inserts which are difficult to crush.

This invention provides stabilizers that are capable of providing foam stability for the desired higher levels of reinforcing grafted copolymer solids in high resiliency molded polyurethane foam. This invention also provides stabilizers that meet the above criteria and provide high breathability foams. A method is provided for preparing these stabilizers. A method is further provided for meeting the stability and breathability requirements of particular firm foam formulations over a wide range of reinforcing grafted copolymer concentrations.

Objectives

It is thus an object of this invention to provide increased foam stabilization and foam breathability by utilizing a single polydialkylsiloxane-polyoxyalkylene copolymer having two or more polyoxyalkylene pendants capped at least one of which is capped with a hydroxy group and at least one of which is capped with either an alkyl group or with an acyl group.

Another object of this invention is to provide a process for making an improved open celled, i.e., high breathability, polyurethane foam from the copolymer described.

It is a still further object of this invention to provide surfactants which can be used in manufacturing foam with higher than normal amounts of solid polymer.

It is yet another object of this invention to provide foams having fewer surface voids.

It is still another object of this invention to provide a process for manufacturing foam utilizing broad processing latitude.

Other objects and advantages of the invention will become apparent as the description thereof proceeds.

BRIEF SUMMARY OF THE INVENTION

This invention is based on the discovery that a polydialkylsiloxane copolymer bearing both hydroxy capped and hydrocarbon capped polyoxylalkylene pendants attached to the free end of the polyethers on the siloxane, can be used to control the cell structure of molded, flexible polyurethane foam, particularly foam containing a high content of reinforcing graft copolymer. Moreover, voids in the foam are eliminated or greatly reduced by the instant invention. Further, these stabilizing advantages are gained while at the same time broad processing latitude and open celled, i.e., high breathability, foam is produced.

More particularly, the stabilizers of the present invention are polydialkylsiloxane-polyoxyalkylene copolymers wherein the polydialkylsiloxane backbone contains no more than ten silicon atoms and the backbone is substituted with an average of at least 0.5 polyoxyalkylene substituents wherein:

1. 5 to 95 percent by weight of the pendants attached to the backbone have the formula $$-R(R')_a(R'')_bX$$

wherein R is a alkylene group of 1 to 4 carbons linked to the silicon atom, R' is an oxyalkylene group of 1 to 4 carbons, R' is a second oxyalkylene group of 1 to 4 carbons which is different from R', a plub b ranges from 1 to about 15, and X is OR³ or

where R³ is a monovalent alkyl group of 1 to 4 carbons; and 2. 95 to 5 percent by weight of the pendants attached to the backbone have the formula $$-R(R')_c(R'')_dOH$$

wherein R is a alkylene group of 1 to 4 carbons linked to the silicon atom, R' is an oxyalkylene group of 1 to 4 carbons, R'' is a second oxyalkylene group of 1 to 4 carbons which is different from R', and c plus d ranges from 1 to about 15.

This invention further relates to the method of the control of foam cell structure and foam breathability through the selection of the relative amounts of 1 and 2 in the above described stabilizers.

DETAILED DESCRIPTION OF THE INVENTION

This invention is based on the discovery that polysiloxane copolymers which contain both hydroxy and hydrocarbon terminated polyoxyalkylene pendants provide unexpected improvements in foam stabilizing and foam breathability contributions of the stabilizer. Blends of polydialkylsiloxane-polyoxyalkylene copolymers where one copolymer contains hydroxy terminated polyoxyalkylene pendants and another copolymer contains alkyl or acyl terminated polyoxyalkylene pendants are also described although the advantages attained using these blends are not as great as with the single copolymer having mixed pendants. A method has also been discovered for controlling the amount of foam stabilization and foam breathability by controlling the relative amounts of hydroxy or hydrocarbon capping on the pendants. These discoveries allow for the production of high breathability, i.e., open-celled, molded, flexible, polyurethane foam having levels of reinforcing grafted copolymer from essentially none to concentrations well in excess of that now possible with conventional stabilizers. The high solids content can be increased by either increasing the concentration of conventional grafted copolymer polyols used in making the resulting urethane foam or by increasing the concentration of copolymer added to the polyol used to make the foam. Foams with higher reinforcing grafted copolymer levels are desirable because they can be used to make firmer foams with improved load bearing capability.

Reactants and Process Conventionally Used For Making the Polyurethane Foam

Polyurethane foam is typically made by combining ethylenically unsaturated monomers in polyether polyol to form grafted copolymer polyols and combining these grafted copolymer polyols with isocyanate, catalyst, surfactant and blowing agent.

The polyether polyol reactants employed in this invention can be any polyether polyol containing at least 40 mole percent of primary hydroxyl groups and having a molecular weight from about 2,000 to about 8,000. The preferred polyether polyols used in this invention are polyalkylene-ether polyols obtained by the chemical addition of alkylene oxides to trihydroxy organic containing materials such as glycerol; 1,2,6-hexanetriol; 1,1,1-trimethylolpropane; and the like as well as mixtures thereof. The alkylene oxides employed in producing the preferred polyether polyols described above normally have from 2 to 4 carbon atoms, inclusive while propylene oxide and mixtures of propylene oxide and ethylene oxide are especially preferred.

The polyether polyol reactants used in this invention can be mixtures consisting essentially of said above defined polyether triols and other polyether polyols having an average of at least two hydroxyl groups, said above defined polyether triols amounting to at least 40, preferably 50, weight percent of the total polyether polyol content of the mixtures. Illustrative of such other polyether polyols are diols, tetrols, reinforcing graft copolymers polyols and the like, as well as mixtures thereof. Examples of such polyether polyols that can be mixed with the above defined polyether triols include those adducts of alkylene oxide to such polyols as diethylene glycol; dipropylene glycol; pentaerythritol; sorbitol; sucrose; lactose; alphamethylglucoside; alpha-hydroxyalkyglucoside; novolac resin; water; ethylene glycol; propylene glycol; trimethylene glycol; 1,2-butylene glycol; 1,3-butanediol; 1,4-butanediol; 1,5-pentanediol; 1,2-hexanediol; 1,2-hexane glycol; 1,10-decanediol; 1,2-cyclohexane-diol; 2-butene-1,4-diol; 3-cyclohexane-1,1-dimethanol; 4-methyl-3-cyclohexene-1,1-dimethanol; 3-methyl-1,5-pentanediol; 4-(2-hydroxyethoxy)-1-butanol; and the like as well as mixtures thereof.

The reinforcing grafted copolymer polyols used in this invention are obtained by polymerizing ethylenically unsaturated monomers in a polyether polyol as described in British Pat. No. 1,063,222 and in U.S. Pat. No. 3,383,351. Suitable grafting monomers for producing such compositions include, for example, acrylonitrile, vinyl chloride, styrene, butadiene, paramethyl styrene, vinylidene chloride, and the like. Suitable polyether polyols for producing such grafted copolymer polyols include, for example, those polyether polyols hereinabove-described. These graft copolymer/polyether polyol compositions can contain from about 1 to 70 weight percent, preferably 5 to 60 weight percent, and most preferably 10 to 50 weight percent of the unsaturated monomer polymerized in the polyether polyol. Such compositions are conveniently prepared by polymerizing the monomer in the selected polyether polyol at a temperature of 40 to 150 degrees centigrade in the presence of a free radical polymerization catalyst, such as peroxides, persulfates, percarbonates, perborate and azo compounds as more fully described by the above patent references. This polymerization is preferably done in situ. Especially preferred are the graft polymer/polyether polyols obtained from mixtures of acrylonitrile and styrene and polyether triols.

Suitable reinforcing graft copolymer polyols employed in this patent may also be obtained from reacting diisocyanates with polyamines or hydrazines in polyether polyol solutions as described in U.S. Pat. No. 4,042,537. Reactants for producing said grafted copolymer polyols include among others the polyisocyanates such as 2,4- and 2,6-toluene diisocyanates and mixtures of these isomers, polyphenyl-polymethylene polyisocyanates, and hexamethylene diisocyanate. The isocyanates are reacted with either polyamines or hydrazines to form the polymer dispersed within and grafted to the polyether polyol solvent for the reaction. Suitable polyamines include: divalent and higher polyvalent primary or secondary, aliphatic araliphatic cycloaliphatic or aromatic amines. Specific examples include among others, ethylene diamine, hexamethylene diamine, 4-aminobenzylamines, 4,4'-diaminodicyclohexylmethane, phenylene diamines, toluene diamines, and the like. Suitable hydrazines include hydrazine, methyl hydrazine, hydrazine hydrate, phenyl hydrazine, benzyl hydrazine and cyclohexyl hydrazine. The level of polyureas of polyhydrazodicarbonamides dispersed in the polyether polyol may vary within wide limits, although it is generally from 1 to 40 percent by weight based on 100 parts by weight of polyether polyol.

A variety of organic isocyanates can be employed in the foam formulations of this invention for reaction with the polyether polyol starting materials above described to provide polyurethane foams. Preferred isocyanates are polyisocyanates and polythiocyanates of the general formula:

wherein i is an integer of two or more and Q is an organic radical having the valence of i. For instance, Q can be a substituted or unsubstituted hydrocarbon radical, such as alkylene and arylene, having one or more aryl-NCO bonds and/or one or more alkyl-NCO bonds. Q can also include radicals such as —RZO—, where R is an alkylene or arylene group and Z is a divalent moiety such as CO, $SO_2$ and the like. Examples of such compounds include hexamethyl diisocyanate, 1,8-diisocyanate-p-methane, xylene diisocyanates, $(OCNCH_2CH_2CH_2OCH_2)_2O$, 1-methyl-2,4-diisocyanatocyclohexane, phenylene diisocyanates, tolylene diisocyanates, chlorophenylene diisocyanates, diphenylmethane-4,4'-diisocyanate, naphthalene-,5-diisocyanate. triphenylmethyl-4,4',4''-triisocyanate, and ispropylbenzene-alpha-4-diisocyanate. Further included among the isocyanates useful in this invention are dimers and trimers of isocyanates such as those having the general formula:

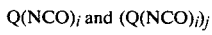

which i and j are integers of two or more, and/or (as additional components in the reaction mixtures) compounds of the general formula:

in which i is one or more and L is a monofunctional or polyfunctional atom or radical. More specifically, the polyisocyanate component employed in the polyurethane foams of this invention also include the following specific compounds as well as mixtures of two or more of them: 2,4-tolylene diisocyanate, crude tolylene diisocyanate, bis(4-isocyanatophenyl)methane, polymethane polyphenylisocyanates that are produced by phosgenation of anilineformaldehyde condensation products, 2,4,6-toluenetriisocyanate, and many other organic polyisocyanates that are known in the art such as those disclosed in an article by Siefken, Ann., 565,75 (1949). In general, the aromatic polyisocyanates are preferred.

Particularly useful isocyanate components are combinations of isomeric tolylene diisocyanates and polymeric isocyanates having units of the formula:

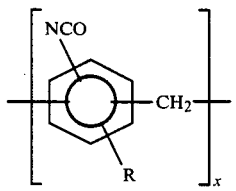

wherein R is hydrogen and/or lower alkyl and x has an average value of at least 2.1. Preferably the lower alkyl radical is methyl and x has an average value of from 2.1 to about 3.0.

The amount of polyisocyanate employed will vary slightly depending on the nature of the polyurethane being prepared. In general the polyisocyanates are employed in the foam formulations of this invention in amounts that provide from 80 to 150 percent, preferably from 90 to 110 percent of the stoichiometric amount of the isocyanato groups required to react with all of the hydroxyl groups of the organic polyol starting materials and with any water present as a blowing agent. Most preferably, a slight amount of isocyanato groups in excess to the stoichiometric amount is employed.

The blowing agents which can be employed in the process of this invention include water, liquified gases which have boiling points below 80° F. and above −60° F., or other inert gases such as nitrogen, carbon dioxide, helium and argon. Suitable liquified gases include saturated aliphatic fluorohydrocarbons which vaporize at or below the temperature of the foaming mass. Such gases are at least partially fluoronated and can also be otherwise halogenated. Fluorocarbon blowing agents suitable for use in foaming the formulations of this invention include trichlorofluoromethane, dichlorodifluoromethane, dichlorofluoromethane, 1,1-chloro-1-fluoroethane, 1,1-difluoro-1,2,2-trichloroethane, and 1,1,1,2,3,3,4,4-nonafluoro-2-chlorobutane. The preferred blowing agent for the process of this invention is trichlorofluoromethane. The amount of blowing agent used will vary the density in the foamed product. Usually from 2 to 20 parts by weight of the blowing agent per 100 parts by weight of the organic polyol starting materials are preferred.

The catalysts employed in this invention to produce polyurethanes include any of the amines or metal catalysts used in producing molded, flexible polyurethane foam. Illustrative of such conventional amine catalysts are N-methyl morpholine, N-ethyl morpholine, hexadecyl dimethylamine, triethylamine, N,N,N',N'-tetramethyl-1,3-butanediamine, N,N-dimethylethanolamine, diethanolamine, 3-dimethylamino-N,N-dimethylpropionamide, bis(2-dimethylaminoethyl)ether, N,N,N',N'-tetramethyl ethylenediamine, 4,4'-methylene bis(2-chloroaniline), dimethyl benzylamine, N-coco morpholine, triethylene diamine, the formate salts of triethylene diamine, other salts of triethylene diamine and oxyalkylene adducts of primary and secondary amino groups and the like. Illustrative of conventional metal catalysts are the tin salts of various carboxylic acids and nickel acetylacetonates. The preferred metal catalyst for the process of this invention is dibutyltindilaurate. Such amine and metal catalysts are preferably employed in the mixtures in an amount from 0.1 to 2 weight percent based on the total weight of the organic polyol starting material.

Other additional ingredients can be employed in minor amounts in producing the high resiliency polyurethane foams in accordance with the process of this invention, if desired, for specific purposes. Thus flame retardants, e.g., trichloroethylphosphine can be used to reduce any tendency of the polyurethane foam to flammability. Of course, any suitable organic solvent for the catalysts can be used which does not substantially adversely affect the operation of the process or reactants. Examples of such solvents for the catalysts include polyols, e.g., 2-methyl-2,4-pentanediol, dipropylene glycol and the like.

In accordance with this invention, the molded, flexible polyurethane foams can be produced by any suitable technique. The preferred process is a one-step or one shot technique wherein all of the reactants are reacted simultaneously with the foaming operation. A second general process is called the prepolymer process whereby a prepolymer is formed by reacting the polyether polyol with a small excess of the isocyanate and later foaming the prepolymer by the reaction with water or an inert blowing agent. Another method which can be used is the quasi-prepolymer technique which involves reacting a large excess of the isocyanate with the polyether polyol with additional polyether polyol in the presence of a blowing agent. Because of the high exothermic nature of the reaction, high resiliency polyurethane foams are rapidly produced without the need of any external heat by mixing the reactants at ambient temperature and pouring the foaming reaction into a suitable mold and allowing the foam to cure itself. Of course, if desired, the overall reaction can be further accelerated by preheating the mold and/or employing conventional high temperature post cure procedures. Of course, it is to be understood that the cold cure polyurethane foams of this invention can also be prepared in slabstock form if desired.

Stabilizers

The essential component in forming the urethane foam is the novel polydialkylsiloxane-polyoxyalkylene stabilizers that are the object of this invention. It is these polydialkylsiloxane-polyoxyalkylene stabilizers that provide cured foam that has fine uniform cells; is free of voids, splits, and holes; and is substantially free from shrinkage. The relative amount of polydialkylsiloxane-polyoxyalkylene stabilizer used to make the polyurethane foam can vary over wide ranges but are generally employed in amounts ranging from about 0.02 to 5 parts by weight or greater per hundred parts of the grafted copolymer polyol, i.e., the combined added copolymer and polyol. Generally there if no commensurate advantage to using these stabilizers in excess of five parts by weight, while the use of amounts below 0.02 parts by weight can result in foam instability. Preferably the polydialkylsiloxane-polyoxyalkylene stabilizers are employed in amounts ranging from 0.02 to 2.0 parts by weight per hundred parts by weight of the organic polyol. The preferred alkyl substituent on the polydialkylsiloxane portion of the copolymer of this invention is methyl.

The stabilizer of this invention consists of a polydialkylsiloxane-polyoxyalkylene copolymer wherein the polysiloxane contains no more than ten silicon atoms and the polysiloxane is substituted with an average of at least 0.5 polyoxyalkylene substituent pendants wherein:

1. 5 to 95 percent by weight of the pendants on the copolymer have the formula

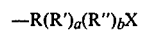

wherein R is an alkylene group of 1 to 4 carbons linked to the silicon atom, R' is an oxyalkylene group of 1 to 4 carbons, R" is a second oxyalkylene group of 1 to 4 carbons which is different from R', a plus b is 1 to 15, and X is $OR^3$ or

where $R^3$ is a monovalent alkyl group of 1 to 4 carbons; and 2. 95 to 5 percent by weight of the pendant on the copolymers have the formula $$-R(R')_c(R'')_dOH$$

wherein R is an alkylene group of 1 to 4 carbons linked to the silicon atom, R' is an oxyalkylene group of 1 to 4 carbons, R'' is a second oxyalkylene group of 1 to 4 carbons which is different from R', and c plus d is 1 to 15.

More particularly, the stabilizer is comprises of linear or branched polydialkylsiloxanes that are substituted with the above described mixture of polyoxyalkylene pendants. The pendant groups can be attached either internally to one of the silicone atoms, to one of the terminal silicone atoms, or some combination of both. Although the attached alkyl group can have 1 to 60 carbons, preferably, the polydialkylsiloxanes are polydimethylsiloxanes that may be linear structures constructed from D ($Me_2Si(O_{\frac{1}{2}})_2$) chain extending units and M ($Me_3SiO_{\frac{1}{2}}$) chain terminating units that contain the above described polyalkyleneoxide pendants either internally on some of the D units, or terminally on some of the M units, or both. Alternatively, the polydialkylsiloxanes may be constructed from M, D, and T (MeSi-$(O_{\frac{1}{2}})_3$) or Q ($Si(O_{\frac{1}{2}})_4$) units, thus creating branching with the polydimethylsiloxanes. In these branched polydialkysiloxanes, the polyoxyalkylene pendants may be attached to the M, D or T units or any combination of these three.

Specific examples of this stabilizer include:

$$Me_3Si(OSiMe_2)_h(OSiMeQ)_i(OSiMeP)_jOSiMe_3$$

wherein Me is a methyl group i has a value of 0.025 to 3.0, j has an average value of 0.025 to 3.0 such that i/j is in the range of 0.05/0.95 to 0.95/0.05, i plus j has an average value of 0.5 to 3.0, h plus i plus j has an average value of 0.5 to 8.0, Q is $$-R(R')_a(R'')_bX$$

and P is $$-R(R')_c(R'')_dOH$$

wherein R, R', R'', a, b, c, d, and X, are as described as above;

$$D_gSi((OSiMe_2)_h(OSiMeQ)_i(OSiMeP)_jOSiMe_3)_{4-g}$$

wherein D is a hydrocarbon free radical free of aliphatic unsaturation and contains from 1 to 10 carbon atoms, g has a value of 0 to 3, and Me, h, i, j, Q, and P are defined as above;

$$(QMe_2Si)_k(OSiMe_2)_h(OSiMeQ)_i(OSiMeP)\text{-}_j(OSiMe_2P)_l$$

wherein Q, P, h, i, and j are as described above, k has an average value of 0.1 to 1.9, l has an average value of 0.1 to 1.9, and k plus l equals 2.0;

$$D_gSi((OSiMe_2)_h(OSiMe_2Q)_m(OSiMe_2P)_n)_{4-g}$$

wherein D, Me, Q, P, and g are as described above, h has a value of 0 to 8, m has a value of 0.05 to 0.95, n has an average value of 0.05 to 0.95, and m plus n has an average value of 1.0.; and $$D_gSi((OSiMe_2)_h(OSiMeQ)_i(OSiMeP)\text{-}_j(OSiMe_2P)_n)_{4-g}$$

where D, g, h, i, j, m and n are as defined above.

Among the above described staiiizers, the preferred copolymer is a linear polysiloxanepolyalkylene copolymer of the general formula $$Me_3Si(OSiMe_2)_h(OSiMeQ)_i(OSiMeP)_jOSiMe_3$$

wherein Me is a methyl group h has an average value of 0.5 to 3.0, i has an average value of 0.025 to 3.0, j has an average value of 0.025 to 3.0, i/j has an average value in the range of 0.50/0.50 to 0.95/0.05, Q is $$-R(R')_a(R'')_bX$$

wherein R is propyl, R' and R'' constitute a polyether made from oxyethyl, oxypropyl or a mixture of oxyethyl and oxypropyl groups to give a total molecular weight of 100 to 450, X is a methoxy group, and P is $$-R(R')_c(R'')_dOH$$

wherein R is propyl, and R' and R'' constitute a polyether made from oxyethyl, oxypropyl or a mixture of oxyethyl and oxypropyl groups to give a total molecular weight of 100 to 450.

Improvements in stabilizer efficacy can also be realized by blending two different copolymers each having polyoxyalkylene pendants with varied capping. One of the polydialkylsiloxane-polyoxyalkylene copolymers, used from 5 to 95 percent by weight, consists of a polydialkylsiloxane containing no more than ten silicone atoms and having an average of 0.5 to about 10 polyoxyalkylene substituent units which are capped with an alkyl or acyl group such that no active hydroxy groups remain. Specific examples of such a copolymer includes:

$$D_gSi((OSiMe_2)_hOSiMe_2E)_{4-g}$$

wherein D is a hydrocarbon free radical free of aliphatic unsaturation and contains from 1 to 10 carbon atoms, g has a value of 0 to 3, h has a value of 0 to 8, Me is a methyl group, E is $$-R(R')_a(R'')_bX$$

wherein R is an alkylene group of 1 to 4 carbons linked to the silicon atom, R' is an oxyalkylene group of 1 to 4 carbons, R'' is a second oxyalkylene group of 1 to 4 carbons which is different from R, a plus b is 1 to 15, and X is $OR^3$ or $$\begin{array}{c} OCR^3 \\ \| \\ O \end{array}$$

where $R^3$ is a monovalent alkyl group of 1 to 4 carbons;

$$EMe_2Si(OSiMe_2)_h(OSiMeE)_jOSiMe_2E$$

wherein E and Me are defined as above, and j has a value from 0 to 4, and h plus j has a value of 0 to 8;

$$D_gSi((OSiMe_2)_h(OSiMeE)_kOSiMe_3)_{4-g}$$

wherein D, g, Me and E are as described above, k has an average value of about 0.5 to 4, and h plus k has an average value of about 0.5 to 8; and $$Me_3Si(OSiMe_2)_h(OSiMeE)_kOSiMe_3$$

wherein Me and E are as described above, and k has an average value of about 0.5 to 4 and h plus k has an average value of about 0.5 to 8.

The second polysiloxanepolyoxyalkylene copolymer for making this blended stabilizer is used from 95 to 5 percent by weight and consists of a polydimethylsiloxane containing no more than twenty silicon atoms, having an average of 0.5 to about 10 polyalkylene substituent units, which units contain an active hydroxy terminal group. Specific examples of such a copolymer include:

$$D_gSi((OSiMe_2)_hOSiMe_2F)_{4-g}$$

wherein D is a hydrocarbon free radical free of aliphatic unsaturation and contains from 1 to 10 carbon atoms, g has a value of 0 to 3, h has a value of 0 to 8, Me is a methyl group, F is $$-R(R')_a(R'')_bOH$$

wherein R is a divalent organic group of 1 to 4 carbons linked to the silicon atom, R' is an oxyalkylene group of 1 to 4 carbons, R'' is a second oxyalkylene group of 1 to 4 carbons, which is different from R', and a plus b is 1 to 15;

$$FMe_2Si(OSiMe_2)_h(OSiMeF)_jOSiMe_2F$$

wherein F and Me are defined as above, and j has a value from 0 to 8, and h plus j has a value of 0 to 18;

$$D_gSi((OSiMe_2)_h(OSiMeF)_kOSiMe_3)_{4-g}$$

wherein D, g, Me and F are as described above, k has an average value of about 0.5 to 10, and h plus k has an average value of about 0.5 to 18; and $$Me_3Si(OSiMe_2)_h(OSiMeF)_kOSiMe_3$$

wherein Me and F are as described above, and k has an average value of about 0.5 to 8 and h plus k has an average value of about 0.5 to 18.

Within the above description of copolymers for a blended stabilizer, the preferred blend is 75 to 95 weight percent of a linear polysiloxanepolyalkylene copolymer with the formula:

$$Me_3Si(OSiMe_2)_h(OSiMeE)_kOSiMe_3$$

wherein Me is a methyl group, k has an average value of about 0.5 to 2.5, h has an average value of about 0.5 to 2.5 and E is an oxyalkylene radical with a molecular weight from 100 to 450 of the formula:

$$-R(R')_a(R'')_bX$$

wherein R is propyl, R' and R'' constitute a polyether made from oxyethyl, oxypropyl or a mixture of oxyethyl and oxypropyl groups to give the desired molecular weight, and X is a methoxy group.

This is blended with 25 to 5 weight percent of a linear polysiloxanepolyalkylene copolymer with the formula:

$$Me_3Si(OSiMe_2)_h(OSiMeF)_kOSiMe_3$$

wherein Me is a methyl group, k has an average value of about of 0.5 to 6, h has an average value of about 0.5 to 6, and F is an oxyalkylene radical with a molecular weight from 100 to 450 of the formula:

$$-R(R')_a(R'')_dOH$$

wherein R is propyl, R' and R'' constitute a polyether made from oxyethyl, oxypropyl or a mixture of oxyethyl and oxypropyl groups to give the desired molecular weight.

While the blends of polymers described above were found to produce surfactants which made more breathable and more stable foams, the increases in stability and breathability were far more pronounced when utilizing single copolymers with mixed pendants attached.

Selection of the ratio of alkyl or acyl capped to hydroxy terminated polyoxyalkylene in the stabilizer is dependent on the amount of solids to be used, and the desirability of open celled structure of the foam. It has been discovered that increasing the relative amount of hydroxy terminated material within the structure increases the amount of stability offered to the foaming solution. Thus, concentrations of grafted copolymer solid well beyond those examined in this or any other invention, can be stabilized by appropriately increasing the hydroxy level in the copolymer.

Of further concern in selecting a particular stabilizer structure, is the breathability or open celled character of the foam as influenced by the stabilizer. The breathability of the foam can be controlled by adjusting the ratio of hydroxy terminated to alkyl or acyl capped polyoxyalkylene used in making the copolymer. Thus increasing the amount of alkyl or acyl capped material increases the breathability of the foam.

EXAMPLES

The following examples and procedures are presented to illustrate the invention, but are not to be construed as limiting thereon. Those examples considered to be examples of the invention are numbered and comparative examples are lettered.

| | Definitions |
|---|---|
| " | inch |
| pphp | parts per hundred parts of polyol used |
| Polymer polyol A | A polymer polyol consisting of about 40% by weight of an acrylonitrile/styrene polymer and the remaining 60% by weight of a base polyol such that the polymer polyol has a hydroxyl number of 31, and a functionality well understood by those practicing in the art. |
| Polyether Polyol B | A polyether polyol based on ethylene and propylene oxides which polyol has a hydroxy number of about 35, about 80% primary, and a functionality well understood by those practicing in the art. |
| Polymer polyol | A polymer polyol |

| | -continued |
|---|---|
| | Definitions |
| C | consisting of about 21% by weight of an acrylonitrile in styrene polymer and the remaining 79% by weight of polyol based on ethylene and propylene oxides which polyol has a hydroxy number of 28, and a functionality well understood by those practicing in the art. |
| Amine catalyst A | An amine catalyst made from bis(2-dimethylamino-ethyl)ether and dipropylene glycol in a ratio of 30 to 70. |
| Amine catalyst B | An amine catalyst made from triethylenediamine and dipropylene glycol in a ratio of 33 to 67. |
| TDI | Tolyene diisocyanate. |
| MDI | Diphenylmethane diisocyanate |
| Surfactant L-5309 | A short chained silicone surfactant which is commonly available from Union Carbide under this trade designation. |
| Surfactant L-5303 | A short chained silicone which is commonly available from Union Carbide under this trade designation. |
| Surfactant L-5307 | A short chained silicone which is commonly available from Union Carbide under this trade designation. |
| Surfactant L-5311 | A short chained silicone which is commonly available from Union Carbide under this trade designation. |
| Surfactant L-5312 | A short chained silicone which is commonly available from Union Carbide under this trade designation. |
| AMTG | allylmethoxytriglycol |
| APEG | allyl started polyethylene oxide |
| APPG | allyl started polypropylene oxide |
| M | $(CH_3)_3SiO_{\frac{1}{2}}$ |
| D | $(CH_3)_2SiO$ |
| D* | The hydrosilation product of $CH_3(H)SiO$ and an allyl started polyethyleneoxide of about 350 molecular weight |
| D** | $CH_3(CH_3O(CH_2CH_2O)_3C_3H_6)SiO$ |
| $D^3$ | The hydrosilation product of $CH_3(H)SiO$ and an alkyl started polyethyleneglycol with an average molecular weight of about 200 |
| $D^4$ | The hydrosilation product of $CH_3(H)SiO$ and a mixture of an allyl started poly-ethyleneoxide with an average molecular weight of 350 and allylmethoxytriglycol |
| $D^5$ | The hydrosilation product of $CH_3(H)SiO$ and allylmethoxy-triglycol blended with an allyl started polyethylene-oxide of molecular weight 350, in the ratio designated in the adjacent column |
| $D^6$ | The hydrosilation product of $CH_3(H)SiO$ and allylmethoxy-triglycol blended with an allyl started polypropylene-glycol of molecular weight 200, in the ratio designated in the adjacent column |

| | -continued |
|---|---|
| | Definitions |
| $D^7$ | The hydrosilation product of $CH_3(H)SiO$ and allylmethoxy-triglycol (AMTG) blended with either an allyl started polyethylene oxide (APEG) of molecular weight 200 (GG, HH and II), or an allyl started polypropylene oxide (APPG) of molecular weight 200 (JJ, KK and LL) in the ratio listed in the adjacent column (AMTG/APEG or AMTG/APPG) |
| $D^8$ | The hydrosilation product of $CH_3(H)SiO$ and allylmethoxy-triglycol (AMTG) blended with either an allyl started polyethylene oxide (APEG) of molecular weight 200 (BB and CC), or an allyl started polypropylene oxide (APPG) of molecular weight 200 (DD and EE) in the ratio listed in the adjacent column (AMTG/APEG or AMTG/APPG) |
| $D^9$ | The hydrosilation product of $CH_3(H)SiO$ and allylmethoxy-triglycol (AMTG) blended with either an allyl started polyethylene oxide (APEG) of molecular weight 200 (CC and MM through PP), or an allyl started propylene oxide (APPG) of molecular weight 200 (QQ and RR) in the ratio listed in the adjacent column (AMTG/APEG or AMTG/APPG) |

General Procedure

A general foaming procedure was adopted for all of the foaming tests presented in this patent. With the exception of the isocyanate, all of the ingredients listed in a particular formulation were weighed into a cup. This solution was then stirred for 60 seconds. The solution was allowed to degas for 15 seconds. The isocyanate was added and the solution stirred for another 5 seconds. Finally, the mixture was poured into the appropriate, preheated mold which was then sealed during the foaming reaction. After a five to ten minute cure, the mold was opened and the foam evaluated.

Block Mold Test and Evaluation

The ability of a surfactant to stabilize foam against shear collapse in a mold was evaluated in a block mold test. A 15"×15"×4" aluminum mold was fitted with an 11.5"×6"×3" aluminum block. The block was situated on the bottom of the mold with each short side of the block 1.75" from side of the mold, and one long side of the block 1.0" from the side of the mold. The foaming solution was poured into the open portion of the mold. After sealing the mold, the foam was allowed to flow around and over the block to fill the entire mold.

After curing, the foam was removed and the top 0.5" cut off. This allowed internal evaluation of shear collapse over the block and under the vents in the lower portion of the foam. The foam was evaluated from one to nine based on the amount of observed collapse, with one representing total collapse and nine representing little or no collapse. Thus the higher the rating the more effective the surfactant was in stabilizing the foam.

Foam Breathability Test

Foam breathability was measured using Formulation 2 to make foams in a 15"×15"×4" box mold. The foaming solution including a selected concentration of surfactant was prepared as described above and poured into the mold which was sealed while the foam cured. Upon removal, the foam was allowed to stand for 15 minutes. At this time the foam was observed for shrinkage. If no shrinkage had occurred, then a second foam was prepared using a higher concentration of surfactant. This process is repeated until a break point is determined that coincides with the onset of shrinkage with increased surfactant concentration. Since shrinkage is related to the number of open cells in the foam, the breathability imparted to the foam by the surfactant can be determined by the amount of surfactant required to cause foam shrinkage. Thus, the higher the required surfactant concentration for shrinkage, the more breathable and better the surfactant. The concentration of the surfactant required for shrinkage is referred to as the top end. A higher top end being better.

Copolymer Preparation

The copolymers tested in this patent were prepared by first equilibrating a source of $(CH_3)_3SiO_{1/2}$ (M), $(CH_3)_2SiO$ (D), and $CH_3(H)SiO$ (D') to make a distribution of oligomers with a nominal structure of $MD_xD'_yM$ such that x and y are dependent on the initial amounts of M, D and D' used. An allyl started polyalkylether pendant (methyl and/or hydroxy terminated) is then hydrosilylated onto the siloxane to form the copolymer, $MD_xD^*_yM$, where M, D, x and y are defined as above, and $D^*$ is the monomer unit bearing the pendant group.

Although this method was used for the examples illustrated in this patent, it is not the only procedure for preparing the structures called for in the patent.

Foaming Formulations

Tests on the surfactants presented in this patent were based on one of the following formulations:

| Formulation 1 | |
|---|---|
| Component | Concentration |
| Polymer polyol A | 50 |
| Polyether polyol B | 50 |
| Amine catalyst A | 0.1 |
| Amine catalyst B | 0.5 |
| Diethanolamine | 0.9 |
| Water | 3.0 |
| TDI/MDI (80/20) | 36.9 |
| Surfactant | Varied |

Concentration is express in parts per hundred parts of polyol.

| Formulation 2 | |
|---|---|
| Component | Concentration |
| Polymer polyol C | 70 to 100 |
| Polyether polyol B | 30 to 0 |
| Amine catalyst A | 0.1 |
| Amine catalyst B | 0.5 |
| Diethanolamine | 0.9 |
| Water | 3.0 |
| TDI (103 index) | 36.8 |
| Surfactant | Varied |

Concentration is express in parts per hundred parts of polyol.

COMPARATIVE EXAMPLES A-I

These examples demonstrate the need for a new class of surfactants that is able to stabilize high solids concentrations in high solid content molded, flexible urethane foam. The tests were run using Formulation 1, as described above, which employs Polymer polyol A as the polymer polyol. It is important to note that the polyol contains 40% acrylonitrile/styrene polymer. When used at 50 pphp the solids content of the resulting foam is about twice the level normally found in high and solid content, molded, flexible urethane foam.

Table 1 shows the results from a series of surfactants evaluated in the block mold test described above. Materials claimed as surfactants for molded, flexible urethane foam generally consist of a short chain silicone containing an alkyl or functional alkyl group as a pendant. The series shown in Table 1 is a representative sampling of the surfactant structures currently available. This includes structures that have methyl capped polyalkyleneoxide pendant groups. The initial tests (Comparative Examples A-E) were run with 1.5 pphp surfactant, which is the normally recommended concentration. The low ratings (2 or 3) for all the surfactants is the result of extensive foam collapse due to the inability of these surfactants, regardless of pendant group, to stabilize the foam. The second set of tests (Comparative Examples F-I) were run with 3.0 pphp surfactant. At best, only modest gains in performance were observed for most of the surfactants. One received a rating of 4, while the rest were rated at 3, which denotes a considerable amount of collapse. Increasing the surfactant concentration beyond this level might be possible, but would have obvious economic disadvantages as well as potential performance problems. These results demonstrate that it is the surfactant structure and not the concentration of surfactant used that is limiting performance.

TABLE 1

| | Block Mold Test with Formulation 1 | | | | |
|---|---|---|---|---|---|
| Comparative Example | Surfactant | Conc. pphp | Added Surfactant | Conc. pphp | Foam Rating |
| A | L-5309 | 1.5 | none | — | 2 |
| B | L-5303 | 1.5 | none | — | 3 |
| C | L-5307 | 1.5 | none | — | 3 |
| D | L-5311 | 1.5 | none | — | 2 |
| E | L-5312 | 1.5 | none | — | 3 |
| F | L-5309 | 3.0 | none | — | 3 |
| G | L-5303 | 3.0 | none | — | 4 |
| H | L-5307 | 3.0 | none | — | 3 |
| I | L-5311 | 3.0 | none | — | 3 |

Surfactant concentration is expressed in parts per hundred parts of polyol used in the formulation (pphp).

COMPARATIVE EXAMPLES J-O

These Examples demonstrate that although many of the hydroxy terminated pendant copolymers useful in this invention are capable of stabilizing high solid content, molded, flexible foams against surface voids, some structures that are useful in this invention can not sbailize foam against surface voids. The use of a copolymer blend, i.e., copolymers which have hydroxy capped polyoxyalkylene pendants blended with those which have hydrocarbon capped pendants, provides a useful stabilizer for both cell structure control and shear collapse.

Table 2 shows the results from a foaming test with three hydroxy terminated pendant copolymers. Foam pads were made using Formulation 2 at 100 pphp of Polymer polyol C and 0 pphp Polyether polyol B. The test was performed in a 15"×15"×4" mold containing no block insert. Whereas the block mold test was used to explore shear stability, the test in this example was performed to demonstrate surface cell structure control in a foam. Normally, a useful surfactant will start to provide fine surface cell structure when the surfactant concentration reaches about 0.5 to 1.0 pphp, and then continue to provide fine cell structure until an extremely high concentration is achieved. The copolymers shown in Table 2 do not exhibit this feature, rather they provide no fine surface cell structure up to concentrations as high as 4.0 pphp.

TABLE 2

Copolymer Structure and Foaming Test Using Hydroxy Terminated Polyoxyalkylene Pendant Copolymers

| Comparative Example | Hydroxy Terminated Copolymer | Copolymer Structure | Surfactant Conc pphp | Evaluation |
|---|---|---|---|---|
| J* | G | $MD_2D^*_4M$ | 1.0 | Severe Surface Voids |
| K* | B | $MD_6D^*_6M$ | 1.0 | Severe Surface Voids |
| L* | B | $MD_6D^*_6M$ | 2.0 | Severe Surface Voids |
| M* | B | $MD_6D^*_6M$ | 4.0 | Severe Surface Voids |
| N* | D | $MD_3D^*_6M$ | 1.0 | Severe Surface Voids |
| O* | D | $MD_3D^*_6M$ | 4.0 | Severe Surface Voids |

*All comparative Examples were run using copolymers having hydroxy terminated pendants as described in this application. The various letters of these hydroxy terminated copolymers represent variations in the polydimethylsiloxane portion of these copolymers.

The copolymer surfactant is diluted to 10 percent by weight in a polyol and then used in the designated concentration which is expressed in parts per hundred parts of the polyol in the formulation.

EXAMPLES 1-23

These Examples demonstrate the unexpected effectiveness of using a surfactant blend consisting of a copolymer that contains hydroxy terminated polyether pendants blended with a cosurfactant that contains methyl capped polyether pendants. The tests were run with the same formulation (Formulation 1) as was used in Comparative Examples A-I.

Tables 3 and 4 show the results from a series of surfactant blends that were evaluated in the block mold test described above. In each case, significant improvement (ratings from 4 to 8) in the ability of the surfactant blend to stabilize the foam against shear collapse was observed.

TABLE 3

Copolymer Structure and Block Mold Test Evaluation Using Hydroxy Terminated Polyoxyalkylene Pendant Copolymers Blended With Methyl Capped Cosurfactant MDD**M

| Example | Hydroxy Terminated Copolymer | Copolymer Structure | Copolymer/ Cosurfactant Ratio | Surfactant Blend Conc/pphp | Foam Rating |
|---|---|---|---|---|---|
| 1 | — | — | 0/100% | 2.5 | 3 |
| 2 | A | $MD_4D^*_4M$ | 1.0/1.5 | 2.5 | 5 |
| 3 | B | $MD_6D^*_6M$ | 1.0/1.5 | 2.5 | 7 |
| 4 | C | $MD_4D^*_6M$ | 1.0/1.5 | 2.5 | 4 |
| 5 | D | $MD_3D^*_6M$ | 1.0/1.5 | 2.5 | 4 |
| 6 | E | $MD_4D^*_8M$ | 1.0/1.5 | 2.5 | 4 |
| 7 | F | $MD_2D^*_6M$ | 1.0/1.5 | 2.5 | 4 |
| 8 | A | $MD_4D^*_4M$ | 1.5/1.5 | 3.0 | 5 |
| 9 | B | $MD_6D^*_6M$ | 1.5/1.5 | 3.0 | 4 |
| 10 | C | $MD_4D^*_6M$ | 1.5/1.5 | 3.0 | 4 |

TABLE 3-continued

Copolymer Structure and Block Mold Test Evaluation Using Hydroxy Terminated Polyoxyalkylene Pendant Copolymers Blended With Methyl Capped Cosurfactant MDD**M

| Example | Hydroxy Terminated Copolymer | Copolymer Structure | Copolymer/ Cosurfactant Ratio | Surfactant Blend Conc/pphp | Foam Rating |
|---|---|---|---|---|---|
| 11 | B | $MD_6D^*_6M$ | 0.1/1.5 | 1.6 | 5 |

The hydroxy terminated copolymer is diluted to 10% by weight in polyol before blending in the ratio shown above.

The methyl capped surfactant was diluted to approximately 25% in polyol before blending in the ratio shown above.

The surfactant blend concentration is expressed in parts per hundred parts of polyol used in the formulation.

TABLE 4

Copolymer Structure and Block Mold Test Evaluation Using Hydroxy Terminated Polyoxyalkylene Copolymers Blended With Methyl Capped Cosurfactant MDD**M

| Example | Hydroxy Terminated Copolymer | Copolymer Structure | Copolymer/ Cosurfactant Ratio | Surfactant Blend Conc/pphp | Foam Rating |
|---|---|---|---|---|---|
| 12 | — | — | 0/100% | 2.5 | 3 |
| 13 | G | $MD_2D^3_4M$ | 1.0/1.5 | 2.5 | 4 |
| 14 | H | $MD_2D^3_6M$ | 1.0/1.5 | 2.5 | 8 |
| 15 | I | $MD_4D^3_4M$ | 1.0/1.5 | 2.5 | 7 |
| 16 | J | $MD_4D^3_8M$ | 1.0/1.5 | 2.5 | 4 |
| 17 | K | $MD_6D^3_6M$ | 1.0/1.5 | 2.5 | 7 |
| 18 | L | $MD_6D^3_8M$ | 1.0/1.5 | 2.5 | 4 |
| 19 | M | $MD_4D^3_6M$ | 1.0/1.5 | 2.5 | 5 |
| 20 | G | $MD_2D^3_4M$ | 1.5/1.5 | 3.0 | 4 |
| 21 | J | $MD_4D^3_8M$ | 1.5/1.5 | 3.0 | 7 |
| 22 | K | $MD_6D^3_6M$ | 1.5/1.5 | 3.0 | 7 |
| 23 | L | $MD_6D^3_8M$ | 1.5/1.5 | 3.0 | 4 |

The hydroxy terminated copolymer is diluted to 10% by weight in polyol before blending in the ratio shown above.

The methyl capped surfactant was diluted to approximately 25% in polyol before blending in the ratio shown above.

The surfactant blend concentration is expressed in parts per hundred parts of polyol used in the formulation.

EXAMPLES 24-36

These Examples demonstrate that further unexpected advantage in stabilizing foam against shear collapse can be gained by preparing copolymers based on the average structure (both silicone and pendant group) of the stabilizing blends demonstrated in Examples 1-23. Thus copolymer N was prepared by first equilibrating M, D and D' to give a nominal structure $MD_{2.5}D'_{1.96}M$ that is the weighted average of silicone structure in hydroxy terminated copolymer B in Examples 1-23 and the silicone structure of the methyl capped cosurfactant used in Examples 1-23. This product was then hydrosilylated with a mixture of allylmethoxytriglycol and an allyl started polyethylene oxide of molecular weight 350. The mixed pendant copolymer thus formed is an average structure silicone that contains a mixture of methyl capped and hydroxy terminated polyether pendants.

The stabilizing ability of this single copolymer with mixed pendants can then be compared to the results for hydroxy terminated copolymer B blended with the methyl capped cosurfactant in Examples 1–23.

Similarly, copolymer P is the average structure of the surfactant blend of hydroxy terminated copolymer F and the methyl capped cosurfactant used in Examples 1–23. Copolymer O is another example that demonstrates that stabilizing advantage of having a copolymer with both hydroxy terminated and methyl capped pendants.

The results of the Block Mold Test using Formulation 1 for the average structure copolymers is shown is Table 5. They clearly demonstrate the surprising advantage of averaging the structures. Thus copolymer N is rated as 9 versus a rating of 7 for the physical blend using copolymer B in Example 3. Copolymer P is rated as 7 versus a rating of 4 for the physical blend using copolymer F in Example 3. Copolymer O also performed well with a rating of 7.

TABLE 5

Copolymer Structure and Block Mold Test Evaluation Mixed Hydroxy and Methyl Terminated Pendant Copolymers

| Example | Mixed Pendant Copolymer | Copolymer Structure | Pendant Ratio | Surfactant Conc. pphp | Foam Rating |
|---|---|---|---|---|---|
| 24 | N | $MD_{2.5}D^4{}_{1.96}M$ | 40/60 | 2.5 | 9 |
| 25 | O | $MD_{1.45}D^4{}_{1.31}M$ | 40/60 | 2.5 | 7 |
| 26 | P | $MD_{1.76}D^4{}_{1.96}M$ | 40/60 | 2.5 | 7 |

The copolymer is diluted to 20% by weight to make the surfactant. The surfactant concentration is expressed in parts per hundred part of polyol.

EXAMPLES 27–36

Examples 27–36 further demonstrates the advantage of having polyoxyalkylene pendants which are both hydroxy terminated and methyl capped in varying ratios in the same copolymer. These examples also show allyl started polyalkylene oxides that incorporate propylene oxide.

TABLE 6

Copolymer Structure and Block Mold Test Evaluation Mixed Hydroxy Terminated and Methyl Capped Copolymers

| Example | Mixed Pendant Copolymer | Copolymer Structure | Pendant Ratio | Surfactant Conc. | Foam Rating pphp |
|---|---|---|---|---|---|
| 27 | Q | $MD_{2.5}D^5{}_{2.0}M$ | 50/50 | 1.5 | 8 |
| 28 | R | $MD_{2.5}D^5{}_{2.0}M$ | 60/40 | 1.5 | 8 |
| 29 | S | $MD_{3.0}D^5{}_{2.0}M$ | 50/50 | 1.5 | 8 |
| 30 | T | $MD_{2.5}D^5{}_{2.0}M$ | 70/30 | 1.5 | 9 |
| 31 | U | $MD_{2.5}D^6{}_{2.0}M$ | 60/40 | 1.5 | 8 |
| 32 | V | $MD_{3.0}D^6{}_{2.5}M$ | 70/30 | 1.5 | 9 |
| 33 | W | $MD_{3.0}D^6{}_{2.0}M$ | 50/50 | 1.5 | 7 |
| 34 | X | $MD_{2.5}D^6{}_{2.0}M$ | 50/50 | 1.5 | 8 |
| 35 | Y | $MD_{3.0}D^6{}_{2.0}M$ | 50/50 | 1.5 | 7 |
| 36 | Z | $MD_{3.0}D^6{}_{2.0}M$ | 70/30 | 1.5 | 9 |

The copolymer is diluted to 25% by weight in a polyol and then used in the designated concentration which is expressed in parts per hundred parts of polyol.

EXAMPLES 37–44 AND COMPARATIVE EXAMPLES P–S

Examples 37–44 demonstrate the unexpected advantage of increasing breathability by preparing a single surfactant having both hydroxy terminated and methyl capped pendants comprised of both ethylene oxide and propylene oxide units. Blended surfactants made from equal amounts of hydroxy terminated polyether pendant copolymers and methyl capped polyether pendant copolymers were foam tested for breathability in the test described above. Analogous surfactants were prepared from single copolymers having equal amounts of both hydroxy terminated and methyl capped polyethers pendants. These were also tested for foam breathability in the above described test. The results are described below and demonstrate that the single mixed surfactants are more open and thus more preferable.

Table 7 shows the results for foam breathability tests of copolymers with pendants made with allylmethoxytriglycol (AMTG) and either allyl started polyethylene oxide (APEG) or allyl started polypropylene oxide (APPG). The tests were run using Formulation 2 with 100 parts of Polymer polyol C which is significantly higher than the normal concentration of 40 to 60 parts. In this test, the totally methyl capped pendant copolymer (FF) did not make a stable foam. For copolymer pendants made from either APEG or APPG, the mixed pendant copolymer (II or LL) provides a more breathable foam than either the hydroxy terminated pendant copolymer (GG or JJ) or the blend of the all hydroxy terminated pendant copolymer and the all methyl capped pendant copolymer (HH and KK).

Table 8 shows a similar set of foam breathability tests for a second silicone structure using the same pendant groups as in Table 6. Formulation 2 was used for these tests, with 70 parts of Polymer polyol C and 30 parts of Polyether polyol B. The results show the same trends as those in Table 7. The mixed AMTG/APEG and AMTG/APPG pendant copolymers are more breathable than the analogous blends of AMTG pendant copolymer with either APEG or APPG pendant copolymer.

TABLE 7

Copolymer Structure and Breathability Foam Test Using Mixed Hydroxy Terminated and Methyl Capped Pendant Copolymers

| Example | Copolymer | Copolymer Structure | Pendant Ratio | Copolymer Blend Ratio | Top End Conc/pphp |
|---|---|---|---|---|---|
| Comparative Example P | FF | $MD_{2.5}D^7{}_{2.5}M$ | 100/0 | — | no stable foam |
| Comparative Example Q | GG | $MD_{2.5}D^7{}_{2.5}M$ | 0/100 | — | 0.75 |
| 37 | HH | $MD_{2.5}D^7{}_{2.5}M$ $MD_{2.5}D^7{}_{2.5}M$ | 100/0 0/100 | 50/50 | 0.75 |
| 38 | II | $MD_{2.5}D^7{}_{2.5}M$ | 50/50 | — | 1.0 |
| Comparative Example R | JJ | $MD_{2.5}D^7{}_{2.5}M$ | 0/100 | — | 1.0 |
| 39 | KK | $MD_{2.5}D^7{}_{2.5}M$ $MD_{2.5}D^7{}_{2.5}M$ | 100/0 0/100 | 50/50 | 1.0 |
| 40 | LL | $MD_{2.5}D^7{}_{2.5}M$ | 50/50 | — | 2.0 |

HH and KK are blends of two independently prepared copolymers. The copolymers were dissolved to 20 weight percent in a polyol and used at the listed concentration expressed in parts per hundred parts of polyol in the formulation.

TABLE 8

Copolymer Structure and Breathability Foam Test Mixed Hydroxy Terminated and Methyl Capped Pendant Copolymers

| Example | Co-polymer | Copolymer Structure | Pendant Ratio | Copolymer Blend Ratio | Top End Conc/pphp |
|---|---|---|---|---|---|
| Comparative Example S | AA | MD$_{1.85}$D$^8_{1.2}$M | 100/0 | — | 3.5 |
| 41 | BB | MD$_{1.85}$D$^8_{1.2}$M<br>MD$_{1.85}$D$^8_{1.2}$M | 100/0<br>0/100 | 50/50 | 0.5 |
| 42 | CC | MD$_{1.85}$D$^8_{1.2}$M | 50/50 | — | 0.75 |
| 43 | DD | MD$_{1.85}$D$^8_{1.2}$M<br>MD$_{1.85}$D$^8_{1.2}$M | 100/0<br>0/100 | 50/50 | 1.25 |
| 44 | EE | MD$_{1.85}$D$^8_{1.2}$M | 50/50 | — | 1.50 |

BB and DD are blends of two independently prepared copolymers. The copolymers were dissolved to 20 weight percent in a polyol and used at the listed concentration expressed in parts per hundred parts of polyol in the formulation.

EXAMPLES 45–51

These Examples demonstrate the ability to control the breathability of the foam by changing the ratio of hydroxy terminated pendant groups to methyl capped pendant groups. A series of copolymers were prepared with different ratios of a methyl capped pendants to hydroxy terminated pendants using pendant groups based on both ethylene oxide and propylene oxide. These were then test in the foam breathability test described above. The results from these tests are shown in Table 9. They demonstrate that the breathability increases in a controllable manner as the ratio of methyl capped pendant to hydroxy terminated pendant increases. Thus it is possible to design a copolymer with the desired foam breathability by adjusting this ratio.

TABLE 9

Copolymer Structure and Foam Breathability Test Mixed Hydroxy Terminated and Methyl Capped Pendant Copolymer
Formulation 2: 70 pphp C - 30 pphp B

| Example | Copolymer | Copolymer Structure | Pendant Ratio | Top End Conc/pphp |
|---|---|---|---|---|
| 45 | CC | MD$_{1.85}$D$^9_{1.2}$M | 50/50 | 0.75 |
| 46 | MM | MD$_{1.85}$D$^9_{1.2}$M | 70/30 | 0.85 |
| 47 | NN | MD$_{1.85}$D$^9_{1.2}$M | 80/20 | 1.0 |
| 48 | OO | MD$_{1.85}$D$^9_{1.2}$M | 85/15 | 1.75 |
| 49 | PP | MD$_{1.85}$D$^9_{1.2}$M | 90/10 | 2.75 |
| 50 | QQ | MD$_{1.85}$D$^9_{1.2}$M | 50/50 | 1.50 |
| 51 | RR | MD$_{1.85}$D$^9_{1.2}$M | 80/20 | 3.25 |

The copolymers were dissolved to 20 weight percent in a polyol and used in the listed concentration expressed in parts per hundred parts of polyol in the formulation.

We claim:

1. A polyurethane foam surfactant which comprises: a single polydialkylsiloxane-polyoxyalkylene copolymer wherein the polydialkylsiloxane contains no more than ten silicon atoms and the backbone is substituted with an average of at least 0.5 polyoxyalkylene substituents wherein
   (a) 5 to 95 percent by weight of the pendants on the copolymer have the formula —R(R')$_a$(R")$_b$X wherein R is an alkylene group of 1 to 4 carbons linked to the silicon atom, R' is an oxyalkylene group of 1 to 4 carbons, R" is a second oxyalkylene group of 1 to 4 carbons which is different from R', a plus b is 1 to 15, and X is OR$^3$ or $$\underset{\underset{O}{\|}}{OCR^3}$$

where R$^3$ is a monovalent alkyl group of 1 to 4 carbons; and
   (b) 95 to 5 percent by weight of the pendants on the copolymer have the formula —R(R')$_c$(R")$_d$OH wherein R is an alkylene organic group of 1 to 4 carbons linked to the silicon atoms, R' is an oxyalkylene group of 1 to 4 carbons, R" is a second oxyalkylene group of 1 to 4 carbons which is different from R', and c plus d is 1 to 10.

2. The surfactant of claim 1 wherein polydialkylsiloxane is linearly construed from R$_2$Si(O$_\frac{1}{2}$)$_2$ chain extending units and R$_3$SiO$_\frac{1}{2}$ chain terminating units that contain the polyoxyalkylene pendants either internally on some of the R$_2$Si(O$_\frac{1}{2}$)$_2$ chain extending units, or terminally on some of the R$_3$SiO$_\frac{1}{2}$ chain terminating units, or both and wherein R is an alkyl group having 1 to 6 carbon atoms.

3. The surfactant of claim 2 wherein R is methyl.

4. The surfactant of claim 1 wherein branched polydialkylsiloxane is constructed from R$_2$Si(O$_\frac{1}{2}$)$_2$ units, R$_3$SiO$_\frac{1}{2}$ units and RSi(O$_\frac{1}{2}$)$_3$ or Si(O$_\frac{1}{2}$)$_4$ units which RSi(O$_\frac{1}{2}$)$_3$ or Si(O$_\frac{1}{2}$)$_4$ units create branching with the polydialkylsiloxanes wherein the polyoxyalkylene chain is attached to the R$_2$Si(O$_\frac{1}{2}$)$_2$ unit, the R$_3$SiO$_\frac{1}{2}$ unit or the RSi(O$_\frac{1}{2}$)$_3$ unit or any combination of the three and wherein R is an alkyl group having 1 to 6 carbon atoms.

5. The surfactant of claim 4 wherein R is methyl.

6. The surfactant of claim 1 wherein the copolymer is:

Me$_3$Si(OSiMe$_2$)$_h$(OSiMeQ)$_i$(OSiMeP)$_j$OSiMe$_3$ wherein Me is a methyl group, i has an average value of 0.025 to 3.0, j has an average value of 0.025 to 3.0 such that the ratio of i to j is in the range of 0.05/0.95 to 0.95/0.05, i plus j has an average value of 0.5 to 3.0, h plus i plus j has an average value of 0.5 to 8.0, Q is —R(R')$_a$(R")$_b$X and P is —R(R')$_c$(R")$_d$OH wherein R, R', R", a, b, c, d, and X are as described in claim 1.

7. The surfactant of claim 1 wherein the copolymer is:

D$_g$Si((OSiMe$_2$)$_h$(OSiMeQ)$_i$(OSiMeP)$_j$OSiMe$_3$)$_{4-g}$ wherein D is a hydrocarbon free radical free of aliphatic unsaturation and contains from 1 to 10 carbon atoms, g has an average value of 0 to 3, Me is a methyl radical, i has an average value of 0.025 to 3.0, j has an average value of 0.025 to 3.0 such that the ratio of i to j is in the range of 0.05/0.95 to 0.95/0.05, i plus j has an average value of 0.5 to 3.0, h plus i plus j has an average value of 0.5 to 8.0, Q is $$-R(R')_a(R'')_b X$$

and P is $$-R(R')_c(R'')_d OH$$

wherein R, R', R", a, b, c, d, and X are as described in claim 1.

8. The surfactant of claim 1 wherein the copolymer is:

$$(QMe_2Si)_k(OSiMe_2)_h(OSiMeQ)_i(OSiMeP)_j(OSiMe_2P)_l$$

wherein k has an average value of 0.1 to 1.9, l has an average value of 0.1 to 1.9, k plus l equals 2.0, i has an average value of 0.025 to 3.0, j has an average value of 0.025 to 3.0 such that the ratio of i to j is in the range of 0.05/0.95 to 0.95/0.05, i plus j has an average value of 0.5 to 3.0, h plus i plus j has an average value of 0.5 to 8.0, Q is $$-R(R')_a(R'')_b X$$

and P is $$-R(R')_c(R'')_d OH$$

wherein R, R', R", a, b, c, d, and X are as described in claim 1.

9. The surfactant of claim 1 wherein the copolymer is:

$$D_g Si((OSiMe_2)_h(OSiMe_2Q)_m(OSiMe_2P)_n)_{4-g}$$

wherein D is a hydrocarbon free radical of aliphatic unsaturation and contains from 1 to 10 carbon atoms, g has an average value of 0 to 3, h has an average value of 0 to 8, m has an average value of 0.05 to 0.95, n has an average value of 0.05 to 0.95, m plus n equals 1.0, Me is a methyl group, Q is $$-R(R')_a(R'')_b X$$

and P is $$-R(R')_c(R'')_d OH$$

wherein R, R', R", a, b, c, d, and X are as described in claim 1.

10. The surfactant of claim 1 wherein the copolymer is:

$$D_g Si((OSiMe_2)_h(OSiMeQ)_i(OSiMeP)_j(OSiMe_2Q)_m(OSiMe_2P)_n)_{4-g}$$

wherein D is a hydrocarbon free radical of aliphatic unsaturation and contains from 1 to 10 carbon atoms, g has an average value of 0 to 3, Me is a methyl radical, i has an average value of 0.025 to 3.0, j has an average value of 0.025 to 3.0 such that the ratio of i to j is in the range of 0.05/0.95 to 0.95/0.05, i plus j has an average value of 0.5 to 3.0, h plus i plus j has an average value of 0.5 to 8.0, m has an average value of 0.05 to 0.95, n has an average value of 0.05 to 0.95, m plus n equals 1, Q is $$-R(R')_a(R'')_b X$$

and P is $$-R(R')_c(R'')_d OH$$

wherein R, R', R", a, b, c, d an X are as described in claim 1.

11. A polyurethane foam surfactant in a polyurethane foam solution which surfactant comprises: a linear polysiloxanepolyalkylene copolymer of the general formula:

$$Me_3Si(OSiMe_2)_h(OSiMeQ)_i(OSiMeP)_j OSiMe_3$$

wherein Me is a methyl group, h has an average value of 0.5 to 3.0, i has an average value of 0.025 to 3.0, j has an average value of 0.025 to 3.0, the ratio of i to j is in the range of 0.50/0.50 to 0.95/0.05, Q is $$-R(R')_a(R'')_b X$$

wherein R is propyl, R' and R" constitute a polyether made from oxyethyl, oxypropyl or a mixture of oxyethyl and oxypropyl groups to give a total molecular weight of 100 to 450, X is a methoxy group, and P is $$-R(R')_c(R'')_d OH$$

wherein R is propyl, and R' and R" constitute a polyether made from oxyethyl, oxypropyl or a mixture of oxyethyl and oxypropyl groups to give a total molecular weight of 100 to 450.

12. A process for making an improved molded, flexible polyurethane foam utilizing the surfactant of claim 1.

13. A process for making an improved molded, flexible polyurethane foam utilizing the surfactant of claim 2.

14. A process for making an improved molded, flexible polyurethane foam utilizing the surfactant of claim 3.

15. A process for making an improved molded, flexible polyurethane foam utilizing the surfactant of claim 4.

16. A process for making an improved molded, flexible polyurethane foam utilizing the surfactant of claim 5.

17. A process for making an improved molded, flexible polyurethane foam utilizing the surfactant of claim 6.

18. A process for making an improved molded, flexible polyurethane foam utilizing the surfactant of claim 7.

19. A process for making an improved molded, flexible polyurethane foam utilizing the surfactant of claim 8.

20. A process for making an improved molded, flexible polyurethane foam utilizing the surfactant of claim 9.

21. A process for making an improved molded, flexible polyurethane foam utilizing the surfactant of claim 10.

22. A process for making an improved molded, flexible polyurethane foam utilizing the surfactant of claim 11.

23. A process for increasing the foam stability of the polyurethane foam of claim 1 by increasing the amount of hydroxy terminated polyoxyalkylen groups in the copolymer relative to the amount of alkyl or acyl terminated polyoxylakylene groups.

24. A process for improving the breathability of the polyurethane foam of claim 1 by increasing the amount of alkyl or acyl terminated polyoxyalkylene groups in the copolymer relative to the amount of hydroxy terminated polyoxyalkylene groups.

* * * * *